Figure 1:
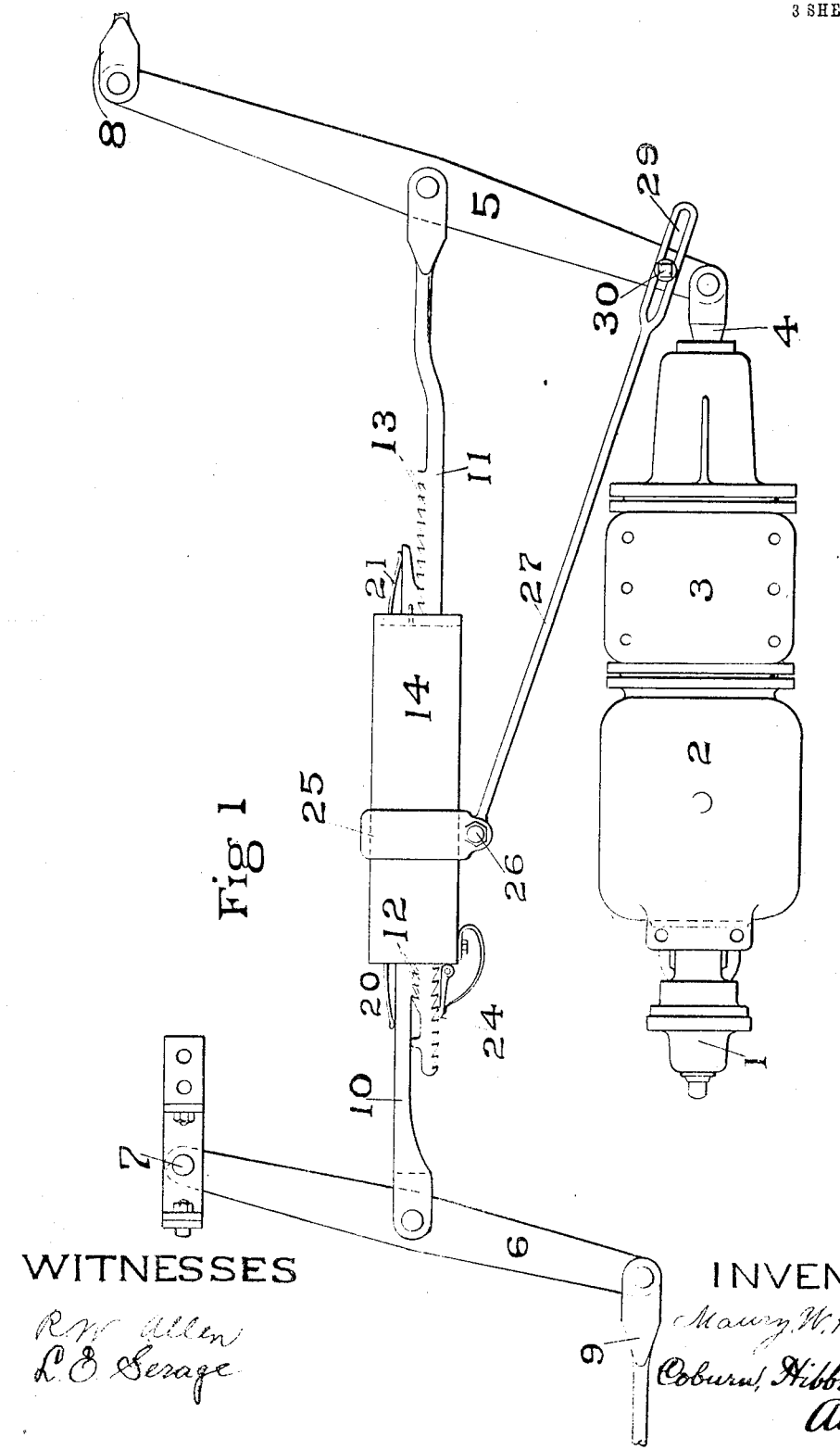

No. 887,637.

PATENTED MAY 12, 1908.

M. W. HIBBARD.
BRAKE SLACK ADJUSTER.
APPLICATION FILED MAY 4, 1899.

3 SHEETS—SHEET 1.

WITNESSES

INVENTOR

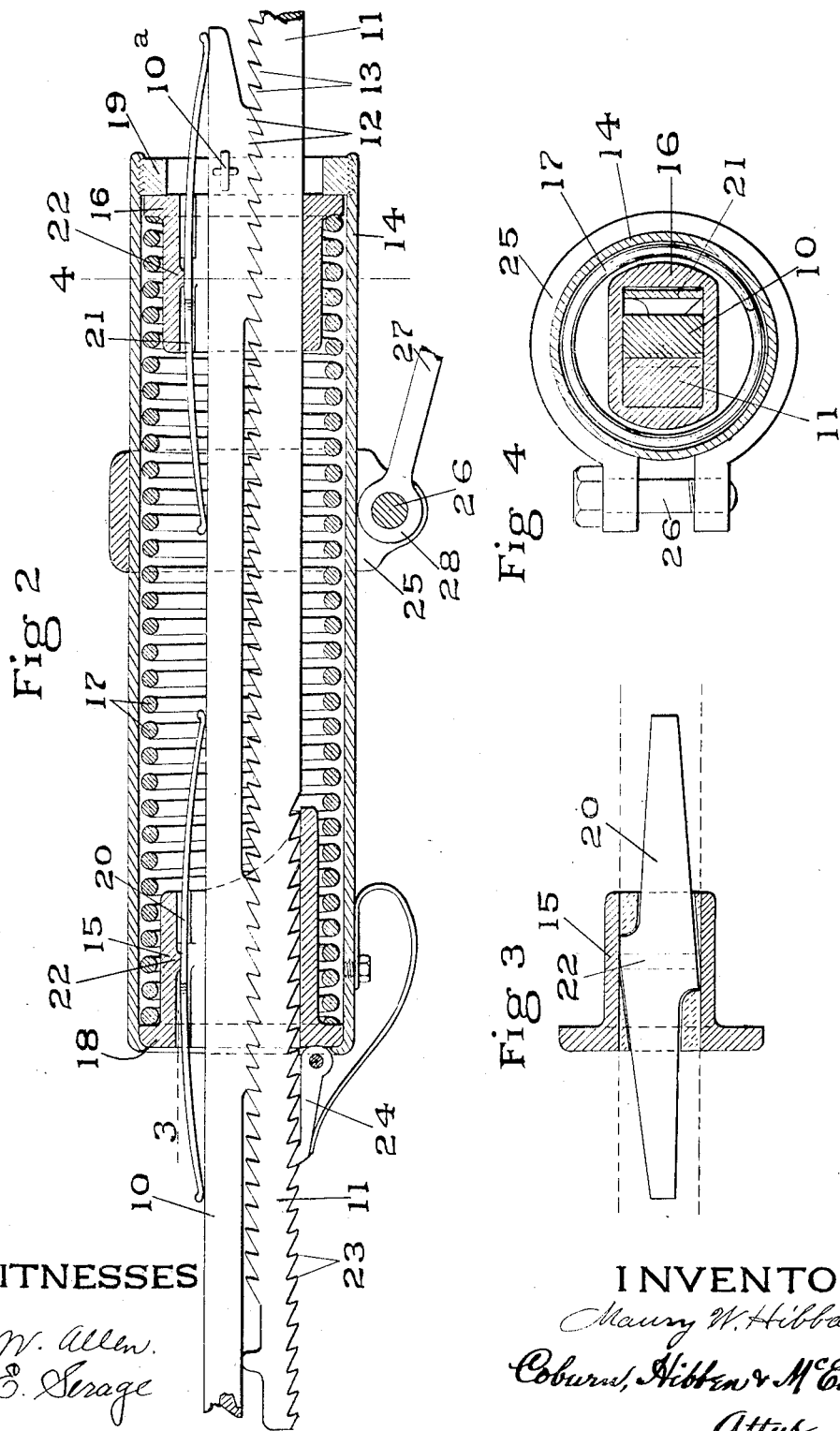

No. 887,637. PATENTED MAY 12, 1908.
M. W. HIBBARD.
BRAKE SLACK ADJUSTER.
APPLICATION FILED MAY 4, 1899.
3 SHEETS—SHEET 3.
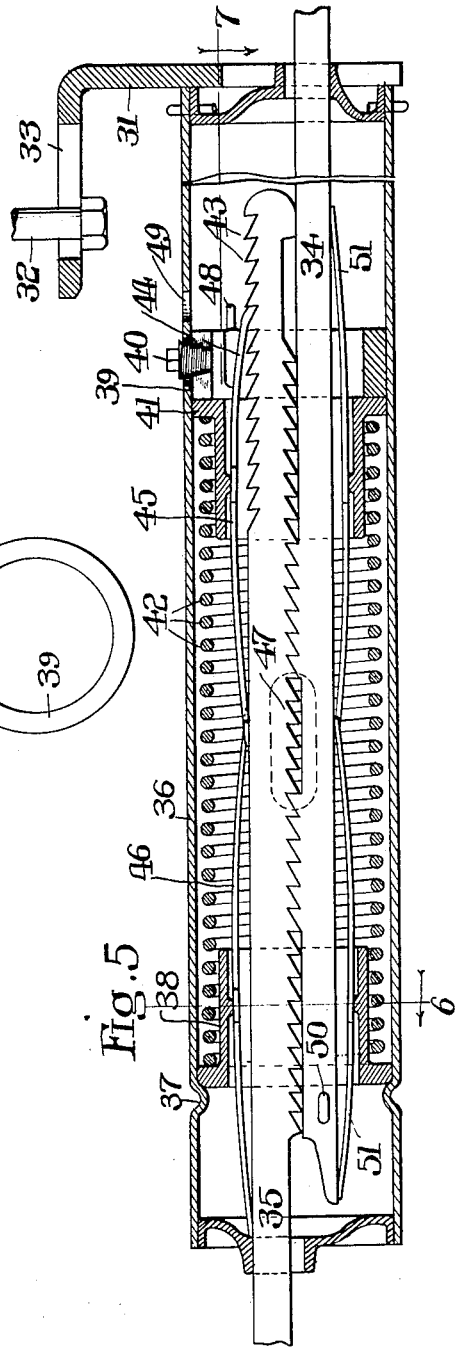
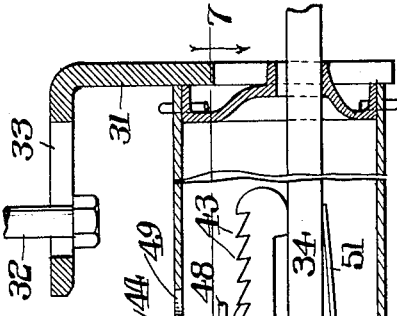
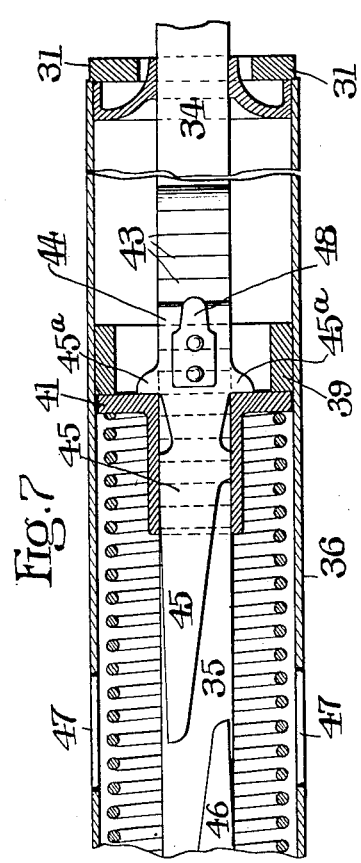
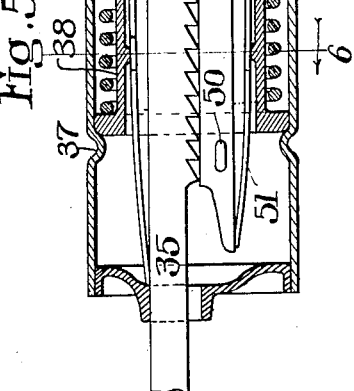
Witnesses:
H. D. N. Barrett.
Robert Dobberman.
Inventor:
Maury W. Hibbard
By Rector & Hibben
his Attys

UNITED STATES PATENT OFFICE.

MAURY W. HIBBARD, OF CHICAGO, ILLINOIS, ASSIGNOR TO RICHARD FITZGERALD, OF CHICAGO, ILLINOIS.

BRAKE-SLACK ADJUSTER.

No. 887,637.　　　Specification of Letters Patent.　　　Patented May 12, 1908.

Application filed May 4, 1899. Serial No. 715,567.

*To all whom it may concern:*

Be it known that I, MAURY W. HIBBARD, residing at Chicago, in the county of Cook and State of Illinois, have invented certain new and useful Improvements in Brake-Slack Adjusters, of which the following is a specification.

My invention relates to a brake slack adjuster used in connection with a brake lever system operated in the usual way by fluid pressure through means of a brake cylinder and a piston traveling therein. In the action of brakes by such means, it is desirable to maintain a predetermined piston travel under the varying conditions due to the wear of the brake shoes. Inasmuch as there is a certain amount of fluid under pressure available for producing the pressure in the brake cylinder, it is obvious that with a short piston travel this amount of fluid will produce a high pressure in the brake cylinder and that with a long piston travel a less pressure in the brake cylinder and, consequently, a less pressure on the brake shoes. As the brake shoes wear away they allow a long piston travel, and it is, therefore, desirable to employ means for adjusting the brake levers in such manner as to maintain the same piston travel under all conditions by taking up the slack. Slack adjusting is at present generally performed by changing the fulcrum point of the braking levers, but unless fluid pressure is obtainable to operate the brakes, the operator is unable to ascertain whether the proper adjustment has been made. This method is also inefficient for other reasons.

When the brake shoes have been so worn as to require replacing with new ones, the leverage must be let out, that is, the fulcrums must be arranged to give such full travel as will permit the shoes to swing entirely clear from the wheels and must not be too long; otherwise, the piston travel will be too great and a sufficient retarding force will not be exerted against the wheels when all the available fluid pressure is used.

The object of my invention is to remedy the practical inefficiencies of the present slack adjusters and to provide an adjuster which is efficient and reliable and automatic in action. By the use of my slack adjuster a proper piston travel is maintained by an automatic adjustment of the levers and a uniform retarding force is exerted on the wheels at all times regardless of the wear of the shoes. Furthermore, on applying new shoes, my mechanism is capable of automatically adjusting the levers in the same manner to take up slack so as to give the piston its proper predetermined travel.

In the drawings, Figure 1 is a plan view of my device shown in connection with the usual brake lever system and the usual fluid pressure brake system; Fig. 2, a sectional elevation of a portion of my slack adjusting device; Fig. 3, a sectional plan on line 3 of Fig. 2; Fig. 4, a sectional elevation on line 4 of Fig. 2; Fig. 5, a section of a modified form of construction; Fig. 6, a section on line 6 of Fig. 5; Fig. 7, a sectional plan on line 7 of Fig. 5; and Fig. 8, a detail of the expandible ring.

In Fig. 1, I have shown the usual triple valve 1, auxiliary reservoir 2 and brake cylinder 3, in which travels the usual piston having a piston rod 4. For the purposes of illustration and description, my invention is shown applied to a well known form of brake lever system having the cylinder lever 5 connected at one end to the piston rod and a floating lever 6 fulcrumed to the car at 7, these levers having the usual brake rods 8 and 9.

The usual connector or bar between the levers is made in two lapping sections or rods 10 and 11 adapted to slide in one direction upon each other and having ratchet teeth 12 and 13 arranged on their meeting faces and engaging when the sections or rods are in juxtaposition so that the rods form practically a single connector between the levers. These rods are surrounded by a case or tube 14 in which are arranged sleeves 15 and 16 at opposite ends. The rod 10 is provided with any suitable projection which is preferably a key 10ª which passes through the rod and presses against the sleeve 16, carrying the same into the case when the device is acting to take up slack. A spiral spring 17 surrounds and bears against these sleeves, forcing the sleeve 15 to one end of the tube or case and against the annular lip 18 and forcing the other sleeve in the opposite direction against the flange 19 screw fitted in the other end of the case. The inner wall of the sleeves on one side is cut away as seen in Fig. 3 to accommodate flat springs 20 and 21, which bear respectively against the fulcrum points 22 and the rod 10. These springs serve to cause the ratchet teeth to engage and thereby hold the rods together, but permit the teeth to be disengaged. On the outer side of the rod 11 are ratchet teeth 23 in which works a spring-pressed pawl 24 pivoted on the case.

A clamp 25 surrounds the case and is capable of adjustment thereon, being clamped in adjusted position by a bolt 26. A rod 27 is provided at one end with an eye 28 connected to the clamp by means of the bolt passing therethrough and is provided at the other end with a slot 29 which receives a stud bolt 30 on the cylinder lever.

In operation, the clamp 25 is on the case at such point as to cause the stud 30 to reach but not to abut the outer end of the slot 29 when the piston has made the desired travel. Any further movement of the piston required to apply the brake shoes will move the case to the right (Fig. 2), causing a compression of the spiral spring owing to the contact of the sleeve 16 against the key. The pawl 24 is carried to the right with the case and takes up one or more ratchets, depending upon the amount of excess travel of the piston. When the brakes are released, the tension of the spiral spring will return the parts and the pawl will force the rod 11 to the left, the other rod meantime being held against the sleeve 16. The flat springs 20 and 21 yield to thus permit the rods to slide upon each other, and to obtain a new engagement of the ratchet teeth. The connection thus formed by these rods between the levers is thus shortened proportionate to the amount of excess piston travel, thereby carrying the brake shoe towards the wheels and taking up the slack. The amount of the piston travel is controlled by the position of the clamp on the case and can be readily adjusted. It is obvious that on the next application of the brakes the brake shoes will be applied with a less travel of the piston, which travel is predetermined. As the brake shoes wear, the connection between levers will be automatically shortened, as above described, to keep the piston travel the same.

When the shoes are worn out and new shoes are required, or, if for any reason it is desired to let out the slack, the pawl is thrown back from its ratchet and the rods are pressed apart to disengage the ratchets against the tension of the flat springs. The rods are now pulled outwards forcing the levers apart and allowing full travel of the brake beams to permit insertion of new shoes. Then after the brakes are set, and during brake release, the rod 27 will cause the slack to be taken up in an automatic manner.

In Figs. 5 to 8 is shown a modified form of construction in which the functions of the rod 27 in the other construction are performed by a stationary depending arm 31. This arm is bent at right angles to form a horizontal portion secured to the bottom of the car by a bolt 32 or otherwise. In order that this arm may be adjusted to the right or left (Fig. 5), it is provided with a slot 33, which receives said bolt. As shown in Figs. 5 and 7, the lower end of the arm is forked or bifurcated to straddle the rod 34. This rod and the rod 35 are connected respectively to a cylinder lever and a floating lever (not shown). The case or tube 36 is beaded at 37 to form an abutment for the sleeve 38. A ring 39 is secured in place near the other end of the case by a swell screw 40 and forms a stop or abutment for the sleeve 41. These sleeves and the spiral spring 42 correspond to the sleeves 15 and 16 and spring 17 in the other construction. The rods are provided on their adjacent faces with ratchet teeth and the rod 35 is provided with teeth 43 in which engages a pawl 44 formed by one end of the flat spring 45 having projecting portions 45$^a$ bearing against the sleeve 41. This spring and the spring 46 normally keep the rods in engagement and in order that they may be forced apart the case is provided with side openings 47 for the insertion of some suitable instrument. On the pawl end of the spring 45 is a hook 48 arranged below an opening 49 in the case, thus affording means for disengaging the pawl. Springs 51 are preferably, though not necessarily, interposed between the rod 34 and the lower side of the sleeves 38 and 41.

When the brakes are set with a predetermined piston travel, the case will be drawn by contact of key 50 with sleeve 38 to the position shown in Fig. 5, so as to touch but not to press against the arm 31 with any force. If the piston should travel a greater distance, the case will contact such arm and the further movement of the rod 34 will force the sleeve 38 to the right (Fig. 5) against the tension of the spiral spring and the pawl will take up one or more ratchets, depending upon the amount of the excess travel of the piston. When the brakes are released, the rods will slip upon each other and a new engagement of the ratchet teeth will take place to shorten the connection between the levers. The amount of piston travel is predetermined and regulated by adjusting the arm 31 in the one direction or the other.

In both forms of construction, the same result is accomplished, to wit, the automatic shortening of the connection between the levers. In the first form the changed relative position of the case and the rods is caused by a more rapid movement of the case while in the second form it is caused by a stoppage of the case in the excess travel of the piston. In both instances, such changed position is maintained by the ratchet and pawl and in brake release the connection is shortened in the same manner.

My invention is not limited to any particular brake lever system and I contemplate employing the same wherever applicable.

I claim:

1. A slack adjuster comprising, in combination with a brake cylinder and its piston and brake levers, a connection between the levers and a spiral spring around said connection, the spring being compressed when the piston has traveled beyond a predetermined point and expanding during brake release to automatically shorten said connection.

2. A slack adjuster comprising, in combination with the levers of a brake lever system operated by a fluid pressure brake, a connection between said levers and a spiral spring surrounding said connection, the spring being compressed upon an excess travel of the piston and expanding during brake release to change the length of the connection between said levers to an amount proportionate to the excess travel of the piston.

3. A slack adjuster comprising, in combination with a brake cylinder lever and a floating lever operated by a piston rod of a brake cylinder, a connection between said levers formed in two sections to constitute a single connection in the setting of the brakes and adapted to slide upon each other to shorten such connection during the brake release after the piston has traveled in excess of a predetermined distance and a spiral spring surrounding said connection and compressed by an excess piston travel but expanding to cause said shortening of the connection.

4. A slack adjuster comprising a brake cylinder piston, a cylinder lever, a floating lever, a single connection between said levers consisting of a pair of rods arranged in juxtaposition and having ratchet teeth on their adjacent faces and means actuated by the excess travel of the piston for shortening said connection by a sliding of the rods on each other and a new engagement of the ratchet teeth.

5. A slack adjuster comprising a brake cylinder piston, a cylinder lever, a floating lever, a single connection between said levers consisting of a pair of rods slidable on each other, means for normally and yieldingly holding said rods in engagement to form a rigid connection and a spiral spring around said connection, said spring being compressed by excess piston travel but adapted, during brake release and after such excess travel, to slide the rods upon each other to shorten said connection.

6. A slack adjuster comprising a brake cylinder piston, a cylinder lever, a floating lever, a force transmitting connection between said levers consisting of a pair of rods slidable upon each other, a case or tube around the rods and coöperating with the rods but movable independent thereof, and adjustable mechanism for regulating the movement of the case to determine the piston travel.

7. A slack adjuster comprising, in combination with a brake cylinder piston, and the brake cylinder lever and floating lever of a brake lever system, a connection between said levers composed of two rods having engaging ratchet teeth in their meeting faces, a tube or case around said rods, a spring therein, means whereby said rods are normally held in engagement to form a single rigid connection, said rods moving with the case in the predetermined travel of the piston but on an excess piston travel having a movement independently thereof to cause a change in its position relative to said rods against the tension of the spring, means for maintaining such changed relative position and cause a sliding of the rods on each other to shorten said connection.

8. A slack adjuster comprising, in combination with a brake cylinder piston and the levers of a brake lever system, a connection between said levers comprising two rods slidable upon each other and normally in engagement to form a single rigid connection, a case or tube therearound, a spring tension connection between the case and rods yielding in one direction, mechanism adjustable for different piston travels and coöperating with the case to cause a change in relative position between the case and rods upon an excess piston travel, and means for taking up and holding such changed position in the application of the brakes and sliding one rod upon the other during the brake release to shorten said connection.

9. A slack adjuster comprising, in combination with a brake cylinder piston and the levers of a brake lever system, a connection between said levers comprising two rods slidable upon each other and having engaging ratchet teeth, a case around said rods, a spring tension device or connection between the case and rods yielding in one direction, said case, during a predetermined travel of the piston, moving with the rods, mechanism for causing an independent movement of the rods and case, such means being adjustable to different piston travels and a pawl and ratchet device for engaging one of the rods to cause a sliding of and a new engagement between the rods to shorten said lever connection.

10. A slack adjuster comprising, in combination with a brake cylinder piston and the levers of a brake lever system, a lever connection consisting of two lapping rods slidable upon each other and normally in engagement to form a single rod connection, a case or tube around lapping portions of the rods, sleeves contained within the case and surrounding the rods, a spring in the case pressing said sleeves to opposite ends thereof, a projection on one of the rods to contact one of the sleeves, a ratchet and pawl connection between the case and the other rod and mechanism coöperating with said case to give the same a differential movement relative to said rods upon a piston travel in excess of a predetermined distance.

11. A slack adjuster comprising, in combination with a brake cylinder piston and the levers of a brake lever system, a lever connection composed of two lapping rods having engaging ratchet teeth and slidable upon each other in one direction, a case or tube surrounding the rods, sleeves contained within the case and surrounding the rods, a spring in the case pressing said sleeves to opposite ends thereof, springs bearing against the rods to hold them yieldingly together, a projection on one rod to contact one sleeve, additional ratchets on the other rod, a spring pressed pawl engaging said last named ratchets and adapted to take up ratchets and slide the rods upon each other during brake release after an excess piston travel.

12. A slack adjuster comprising, in combination with a brake cylinder piston and the levers of a brake lever system, a lever connection composed of two lapping rods or bars having engaging ratchet teeth and slidable upon each other in one direction, a case or tube surrounding the rods, sleeves within the case and around the rods, a portion of the inner wall of each sleeve being cut away and providing fulcrums 22, springs received in such cut away portions and bearing respectively against said fulcrums and one of the rods to yieldingly hold the rods in engagement, a spiral spring normally pressing the sleeves to opposite ends of the case, one of the rods having a projection contacting one sleeve, a pawl and ratchet connection between the other rod and the case and an adjustable connection between the case and one of the movable parts of the lever system.

13. A slack adjuster comprising, in combination with a brake cylinder piston and a brake lever system having a cylinder lever and a floating lever, a connector arranged between said levers and adjustable in length, a case around said connector, a spring tension connection between the rod and case, a rod connected at one end to the case and having a slot at its other end and a pin or stud on the cylinder lever received by such slot and adapted to actuate the slotted rod when the piston travel exceeds a predetermined distance, and thereby move the case to shorten the connecting rod.

14. A slack adjuster comprising, in combination with a brake cylinder piston and a brake lever system having a cylinder lever and a floating lever, a connector arranged between said levers and adjustable in length, a case surrounding such connector and adapted to shorten the same after a change in their relative movements, an adjustable clamp on said case, a pin or stud on the cylinder lever, and a rod connected at one end to the clamp and having its other end slotted to receive the pin whereby there will be no movement of the case relative to the case except in case the piston travels beyond a predetermined distance and causes the stud to draw the case longitudinally of the connector.

15. A slack adjuster for a fluid pressure actuated brake lever system comprising, in combination with the cylinder lever and the floating lever, a rod connected to the cylinder lever and a rod connected to the floating lever normally forming a single force transmitting connection between the levers, the rods having ratchet teeth on their meeting faces which hold the rods rigid in setting the brakes and permit a sliding of the rods on each other in releasing the brakes after an excess piston travel, thereby shortening said connection between the levers.

16. In a brake slack adjuster for a fluid pressure actuated brake lever system, lapping rods normally in engagement with each other and connected respectively to the cylinder lever and floating lever, in combination with springs holding the rods rigidly and in engagement in setting the brakes but yielding in brake release after an excess piston travel to permit the rods to slide upon each other and thereby shorten the connection between the levers.

17. A slack adjuster comprising, in combination with the brake levers, a two part overlapping tie rod arranged between such levers, a resilient device coöperating with such rod and yielding upon an excess travel of the levers on application of the brakes and reacting to eliminate slack on the release of the brakes and adjustable mechanism for determining or regulating the amount of movement of the brake levers.

18. A slack adjuster comprising, in combination with the brake levers, a two part overlapping tie rod between the levers and a spring coöperating with such rod and adapted to be compressed by an excess travel of the levers upon application of the brakes and re-acting to eliminate slack on the release of the brakes.

19. A slack adjuster comprising, in combination with the brake levers, a two part tie rod arranged between the levers and having engaging ratchets on the meeting faces of the two parts, a spiral spring coöperating with such rod and a case containing such spring and having a movement independent of the rod to compress the spring upon an excess travel of the levers at an application of the brakes, such spring re-acting to shorten the tie rod on the release of the brakes.

20. A slack adjuster comprising, in combination with the brake levers, a tie rod in two parts capable of adjustable engagement with each other to form a rod of different lengths, and a spring coöperating with such rod and adapted to be compressed by an excess travel of the levers upon application of the brakes and re-acting to slide the two parts of the rod upon each other to shorten such rod.

21. A slack adjuster comprising, in combination with brake levers, an extensible tie-rod coöperating with such levers and resilient means coöperating with the tie-rod and, after an excess travel of the levers upon an application of the brakes, causing a shortening of such tie-rod by causing said sections to slide upon each other and obtain a new relative position with respect to each other.

22. A slack adjuster comprising, in combination with brake levers, an extensible tie-rod coöperating with such levers and consisting of two overlapping parts or sections, and a resilient device coöperating with such rod and yielding upon an excess travel of the levers on application of the brakes and reacting to eliminate slack on the release of the brakes, by causing said sections to slide upon each other and obtain a new relative position with respect to each other.

23. A slack adjuster comprising, in combination with the brake levers, an extensible tie-rod coöperating with such levers and consisting of two overlapping parts or sections having engaging ratchet teeth on their adjacent or meeting surfaces and a spiral spring encircling said sections and coöperating therewith, said spring being adapted to be compressed by an excess travel of the levers upon application of the brakes and reacting to cause said sections to slip upon each other and thereby shorten the tie-rod and eliminate slack.

24. A slack adjuster comprising, in combination with a brake cylinder and its piston and brake levers, a connection between the levers and a spring coöperating with and surrounding said connection, such spring being compressed when the piston has traveled beyond a predetermined point and expanding during brake release to automatically shorten said connection.

25. A slack adjuster comprising, in connection with a brake cylinder and its piston and brake levers, a connection between the levers comprising a pair of over-lapping rods slidable on each other, and means coöperating with said connection for shortening it after a piston travel beyond a predetermined point, said means consisting of a coiled spring surrounding said rods.

26. A slack adjuster, in connection with a brake cylinder and its piston and brake levers, a connection between the levers comprising a pair of overlapping rods slidable on each other, and means coöperating with said connection for shortening it after a piston travel beyond a predetermined point and shortening it to an amount proportionate to the excess travel of such piston, said means comprising a coiled spring surrounding said rods and operatively connected therewith at its opposite ends.

27. A slack adjuster comprising, in connection with a brake cylinder and its piston and brake levers, an operating connection between said levers comprising a pair of rods slidable upon each other and having their adjacent or meeting faces arranged to engage each other, means for normally holding said rods in engagement with a yielding pressure so as to form an operating connection, and means coöperating with said connection for shortening it as a piston travel beyond a predetermined point, said means consisting of a coiled spring whose opposite ends are operatively connected to said rods respectively.

MAURY W. HIBBARD.

Witnesses:
SAMUEL E. HIBBEN,
LOUISE E. SERAGE.